US011440551B2

(12) United States Patent
Hudson et al.

(10) Patent No.: US 11,440,551 B2
(45) Date of Patent: Sep. 13, 2022

(54) AUTOMATIC CRAB STEERING ON SIDE HILLS

(71) Applicant: Deere & Company, Moline, IL (US)

(72) Inventors: Scott A. Hudson, Cedar Falls, IA (US); Jeffrey M. Tott, Cedar Falls, IA (US); Edwin R. Kreis, Waterloo, IA (US); Dennis A. Bowman, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 156 days.

(21) Appl. No.: 16/560,475

(22) Filed: Sep. 4, 2019

(65) Prior Publication Data
US 2021/0061283 A1 Mar. 4, 2021

(51) Int. Cl.
  *B60W 30/18* (2012.01)
  *B62D 7/14* (2006.01)
  *B62D 6/00* (2006.01)

(52) U.S. Cl.
  CPC ......... *B60W 30/18172* (2013.01); *B62D 6/00* (2013.01); *B62D 7/14* (2013.01);
  (Continued)

(58) Field of Classification Search
  CPC ..... B60W 30/18172; B60W 2300/152; B60W 2520/10; B60W 2520/125;
  (Continued)

(56) References Cited

U.S. PATENT DOCUMENTS

| 3,380,547 A | 4/1968 | Granryd |
| 4,373,603 A * | 2/1983 | Nelson ................. B62D 7/1509 |
| | | 172/3 |

(Continued)

FOREIGN PATENT DOCUMENTS

| DE | 3707700 A1 | 9/1987 |
| DE | 3837141 A1 | 5/1989 |

(Continued)

OTHER PUBLICATIONS

German Search Report issued in application No. DE102020209829. 8, dated Jun. 13, 2022, 04 pages.

*Primary Examiner* — Jaime Figueroa
*Assistant Examiner* — Joshua Alexander Garza
(74) *Attorney, Agent, or Firm* — Taft Stettinius & Hollister LLP; Stephen F. Rost

(57) ABSTRACT

Steering a vehicle in an electronic steering mode of operation that includes a front axle steering system, a rear axle steering system, one or more vehicle environment sensors, and a controller operatively coupled with the front axle steering system, the rear axle steering system, and the vehicle environment sensors. Commanding the vehicle to operate at a desired vehicle speed, detecting a lateral force acting on the vehicle in response to input from the vehicle environment sensors, and determining an actual lateral acceleration of the vehicle and a predicted lateral acceleration of the vehicle from the desired vehicle speed. Determining a lateral acceleration error by comparing the predicted lateral acceleration to the actual lateral acceleration, and determining if the lateral acceleration error exceeds a lateral acceleration limit, then turning both of the front axle steering system and the rear axle steering system to a crab steering correction angle.

20 Claims, 4 Drawing Sheets

(52) U.S. Cl.
CPC ... *B60W 2300/152* (2013.01); *B60W 2520/10* (2013.01); *B60W 2520/125* (2013.01); *B60W 2520/14* (2013.01); *B60W 2520/18* (2013.01); *B60W 2520/26* (2013.01); *B60W 2710/20* (2013.01)

(58) Field of Classification Search
CPC ......... B60W 2520/14; B60W 2520/18; B60W 2520/26; B60W 2710/20; B62D 6/00; B62D 7/14
See application file for complete search history.

(56) References Cited

U.S. PATENT DOCUMENTS

| | | | |
|---|---|---|---|
| 4,565,257 A | 1/1986 | Hanson | |
| 4,771,851 A | 9/1988 | Nystuen et al. | |
| 5,234,069 A | 8/1993 | Krone et al. | |
| 6,164,406 A * | 12/2000 | Diekhans | B62D 7/1509 |
| | | | 180/327 |
| 6,427,195 B1 | 7/2002 | McGowen et al. | |
| 6,708,631 B1 | 3/2004 | McQuinn et al. | |
| 7,316,288 B1 | 1/2008 | Bennett et al. | |
| 7,383,114 B1 | 6/2008 | Lange et al. | |
| 9,103,098 B2 | 8/2015 | Zhu | |
| 2005/0217906 A1* | 10/2005 | Spark | B62D 9/00 |
| | | | 180/22 |
| 2007/0299580 A1* | 12/2007 | Lin | B62D 15/025 |
| | | | 701/41 |
| 2010/0131144 A1* | 5/2010 | Ryu | B60W 40/103 |
| | | | 701/79 |
| 2014/0041884 A1* | 2/2014 | Zhu | E02F 9/2087 |
| | | | 172/2 |
| 2014/0229072 A1* | 8/2014 | Kang | B62D 7/159 |
| | | | 701/42 |
| 2017/0247038 A1* | 8/2017 | Savaresi | B60T 8/17552 |
| 2018/0251123 A1* | 9/2018 | Sigmar | H02K 11/33 |
| 2018/0297605 A1* | 10/2018 | Kasaiezadeh Mahabadi | |
| | | | B60W 40/114 |
| 2019/0106113 A1* | 4/2019 | Kato | B60W 40/114 |
| 2019/0329819 A1* | 10/2019 | Shan | B62D 5/12 |
| 2020/0269915 A1* | 8/2020 | Putz | B62D 13/005 |

FOREIGN PATENT DOCUMENTS

| | | |
|---|---|---|
| DE | 3937124 A1 | 5/1991 |
| DE | 19716201 A1 | 10/1998 |
| DE | 102005044493 A1 | 4/2007 |
| DE | 102007009112 A1 | 8/2008 |
| EP | 1174329 A2 | 1/2002 |
| EP | 2404808 B1 | 7/2014 |

* cited by examiner

AUTOMATIC CRAB STEERING ON SIDE HILLS

FIELD OF THE DISCLOSURE

The present disclosure relates to a work vehicle having automatic crab steering control, and in particular, for compensating for certain operating conditions acting on the vehicle by turning a front axle steering system and a rear axle steering system to a crab steering correction angle when certain operating conditions are detected.

BACKGROUND OF THE DISCLOSURE

Work vehicles are configured to perform a wide variety of tasks for use such as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field.

Tractors generally include four or more wheels, in which two or more wheels sharing a common axle are located toward the front of the vehicle, and two or more wheels sharing a common axle are located toward the rear of the vehicle. Other configurations of axles are known and include tractors having two rear axles or tractors including a front axle, a middle axle and a rear axle.

Four-wheel steering is a system employed by some vehicles, including tractors, to improve steering response, increase vehicle stability while maneuvering at high speed, or to decrease turning radius at low speed. In an active four-wheel steering system, all four wheels turn at the same time when the driver steers. The rear wheels generally cannot turn as far as the front wheels. Crab steering is a special type of active four-wheel steering that operates by steering all wheels in the same direction and at the same angle. Crab steering is often used when the vehicle needs to proceed in a straight line but under an angle, or when the rear wheels may not follow the front wheel tracks.

Tractors of different types include front wheel drive, rear wheel drive, four wheel drive, or all-wheel drive systems. In addition, tractors of different types include a non-articulated frame such that the position of the front axle and the position of the rear axle cannot be adjusted along a longitudinal axis of the tractor. Other tractors include an articulated frame wherein the front axle is mounted to a front frame, the rear axle is mounted to a rear frame, and the front frame is rotatably coupled to the rear frame at a pivot location, such that the front frames and the rear frames are articulated with respect to one another. In some embodiments of an articulated tractor, the rotatable coupling can be locked to prevent articulation.

While articulated tractors provide a large amount of traction, and are often used for tilling crops or for pulling heavy loads, precise control of the articulated tractor can present certain problems due to the nature of steering adjustment. One problem frequently encountered in farming is when using a tractor on an extreme hill-side operation, the tractor will slide while trying to maintain the load, e.g., during air seeding. In this operation, the tractor is applying power to the ground surface for farming, however, there is a tendency for the tractor to slide downhill during this operation due to a lateral force that is applied to the tractor during this operation. As another example, when the tractor is pulling an implement that engages the ground surface on a hill side such as for tilling, there is a lateral force being applied to the tractor. There are other situations where lateral forces also act on a tractor or vehicle, which cause the vehicle to slide laterally instead of travel straight. In any of these situations, the tractor or vehicle continues to try to drive straight but will not drive straight as the lateral force causes the tractor to slide down the hill or slide laterally. Consequently, what is needed is a tractor having a steering system configured to provide for improved steering under one or more or all conditions, including improving operator steering of the tractor while operating the tractor in a hill-side condition or when other lateral forces are applied to the tractor to compensate for these lateral forces.

SUMMARY

The present disclosure may comprise one or more of the following features and combinations thereof.

According to one embodiment of the present disclosure, a system comprising: a vehicle including a front axle steering system, a rear axle steering system, one or more vehicle environment sensors, and a controller operatively coupled with the front axle steering system, the rear axle steering system, and the one or more vehicle environment sensors, wherein the controller is configured to: operate the vehicle in an electronic steering mode of operation at a desired vehicle speed; detect presence of a lateral force on the vehicle in response to input from the one or more vehicle environment sensors; in response to detection of the lateral force on the vehicle and based on the desired vehicle speed, determine an actual lateral acceleration of the vehicle and a predicted lateral acceleration of the vehicle; determine a lateral acceleration error by comparing the predicted lateral acceleration to the actual lateral acceleration; and determine if the lateral acceleration error exceeds a lateral acceleration limit, then compensate for the lateral force acting on the vehicle by turning both of the front axle steering system and the rear axle steering system to a crab steering correction angle.

In a further embodiment, the crab steering correction angle is adjusted by an operator correction factor.

In a further embodiment, the crab steering correction angle includes a front axle steering angle and a rear axle steering angle, the front axle steering system configured to adjust to the front axle steering angle and the rear axle steering system configured to adjust to the rear axle steering angle. In a further refinement of this embodiment, the front axle steering angle is different from the rear axle steering angle.

In a further embodiment, the vehicle includes an articulated steering system between the rear and the front axle steering systems configured to laterally offset the rear axle steering system from the front axle steering system.

In a further embodiment, the one or more sensors measure a yaw rate and an actual vehicle speed.

In a further embodiment, the one or more sensors include a lateral accelerometer.

In a further embodiment, the one or more sensors measure a vehicle roll angle; and adjusting the crab steering correction angle based on the vehicle roll angle.

In a further embodiment, the front axle steering system includes at least two wheels, the rear axle steering system includes at least two wheels, wherein the one or more sensors measures a wheel slip condition of each of the wheels of the front axle steering system and the rear axle steering system; and adjusting the crab steering correction angle based on the wheel slip condition being satisfied for any of the wheels.

In a further embodiment, the crab steering correction angle is between 0 and 15 degrees as measured relative to a longitudinal axis of each of the front axle steering system and the rear axle steering system.

According to yet another embodiment of the present disclosure, a method of steering a vehicle, comprising: operating the vehicle in an electronic steering mode of operation wherein the vehicle includes a front axle steering system, a rear axle steering system, one or more vehicle environment sensors, and a controller operatively coupled with the front axle steering system, the rear axle steering system, and the one or more vehicle environment sensors; commanding the vehicle to operate at a desired vehicle speed; detecting a lateral force acting on the vehicle in response to input from the one or more vehicle environment sensors; in response to detecting the lateral force, determining an actual lateral acceleration of the vehicle and a predicted lateral acceleration of the vehicle from the desired vehicle speed; determining a lateral acceleration error by comparing the predicted lateral acceleration to the actual lateral acceleration; and determining if the lateral acceleration error exceeds a lateral acceleration limit, then turning both of the front axle steering system and the rear axle steering system to a crab steering correction angle.

In a further embodiment, the crab steering correction angle is adjusted by an operator correction factor.

In a further embodiment, the crab steering correction angle includes a front axle steering angle and a rear axle steering angle; adjusting the front axle steering system to the front axle steering angle; and adjusting the rear axle steering system to the rear axle steering angle.

In a further embodiment, the front axle steering angle is different from the rear axle steering angle.

In a further embodiment, the vehicle includes an articulated joint between the rear and the front axle steering systems; and offsetting laterally the rear axle steering system from the front axle steering system.

In a further embodiment, further comprising: measuring a yaw rate and an actual vehicle speed with the one or more sensors; and determining the actual lateral acceleration with the yaw rate and actual vehicle speed.

In a further embodiment, the one or more sensors include a lateral accelerometer for measuring the actual lateral acceleration.

In a further embodiment, the one or more sensors measure a vehicle roll angle; and adjusting the crab steering correction angle based on the vehicle roll angle.

In a further embodiment, the front axle steering system includes at least two wheels, the rear axle steering system includes at least two wheels, measuring a wheel slip condition of each of the wheels of the front axle steering system and the rear axle steering system with one or more sensors; and adjusting the crab steering correction angle based on the wheel slip condition being satisfied for any of the wheels.

In a further embodiment, the crab steering correction angle is between 0 and 15 degrees as measured relative to a longitudinal axis of each of the front axle steering system and the rear axle steering system.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
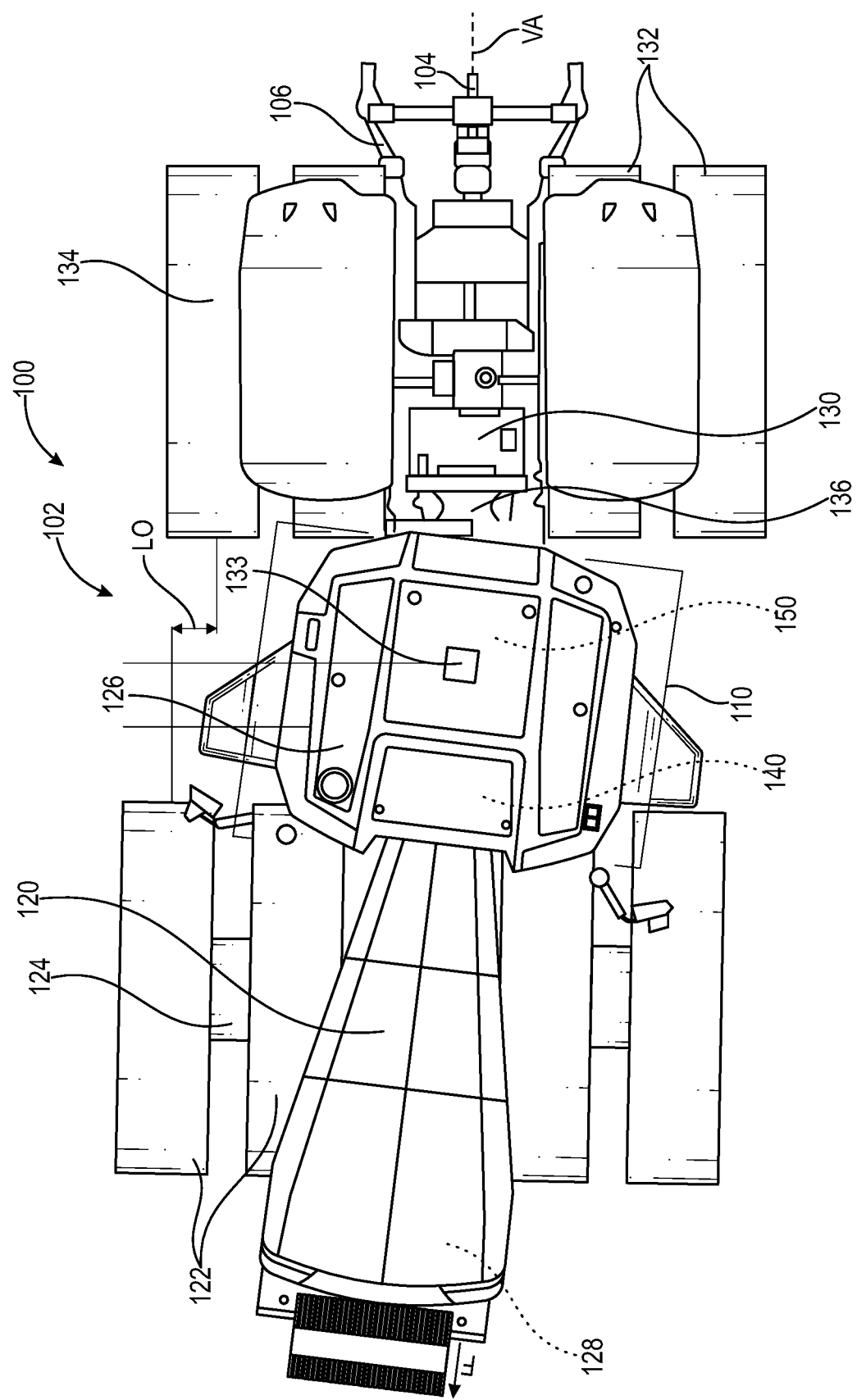
FIG. 1 is a top view of an agricultural vehicle that includes a front section coupled to front wheels and a rear articulation section coupled to rear wheels and pivotally coupled to the front section.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an agricultural vehicle 100 is embodied as, or otherwise includes, a tractor 102 that is configured to tow, pull, or otherwise drive movement of, one or more work implements (not shown) which may be attached thereto. The tractor 102 includes an implement attachment interface 104 to attach the one or more work implements at a rear end 106 of the tractor 102. It should be appreciated that in some embodiments, the implement attachment interface 104 may be embodied as, or otherwise include, a hitch, a drawbar, or the like.

Figure 3:
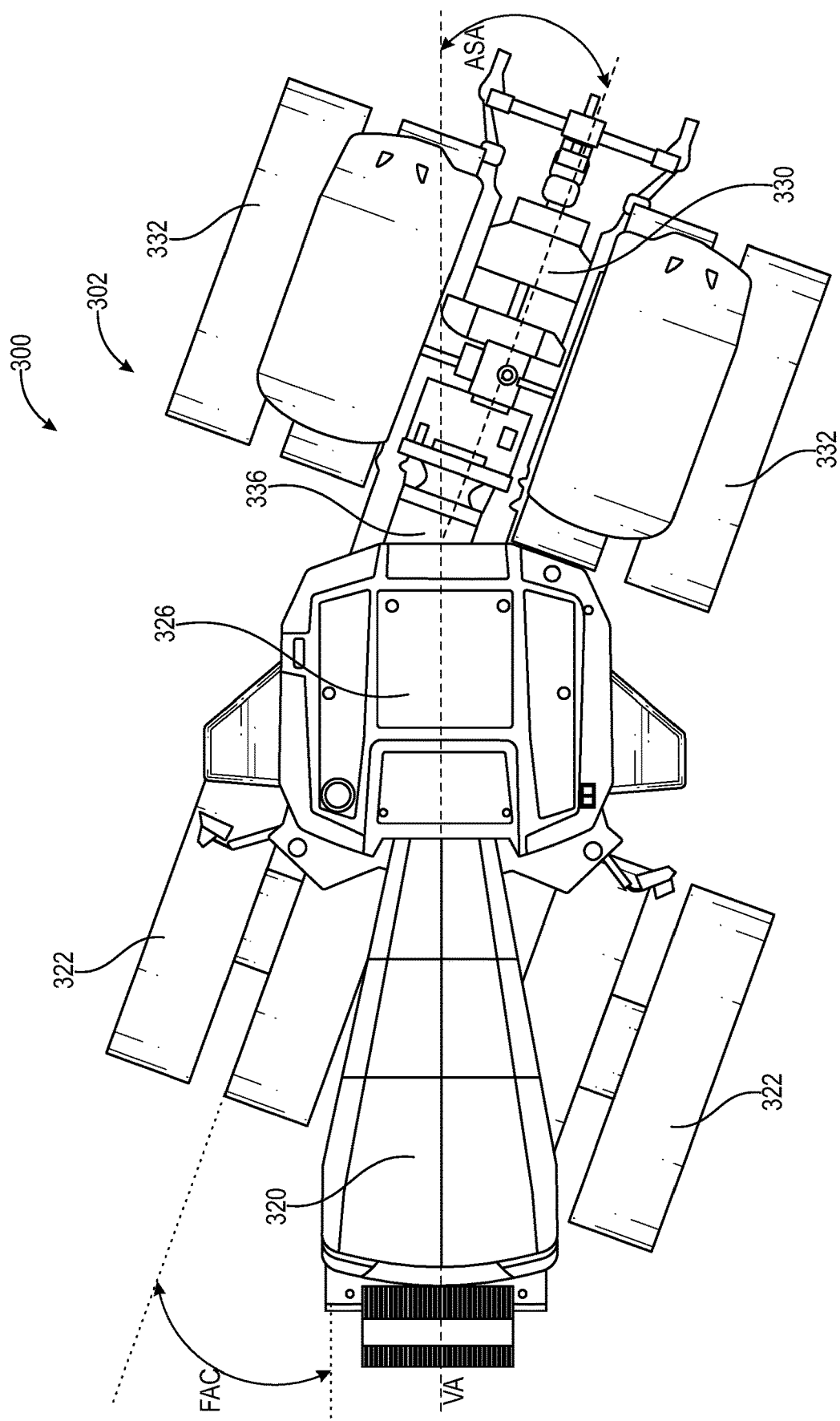
FIG. 3 is a top view of another embodiment of an agricultural vehicle that includes a front section coupled to front wheels and a rear articulation section coupled to rear wheels and pivotally coupled to the front section.
Figure 4:
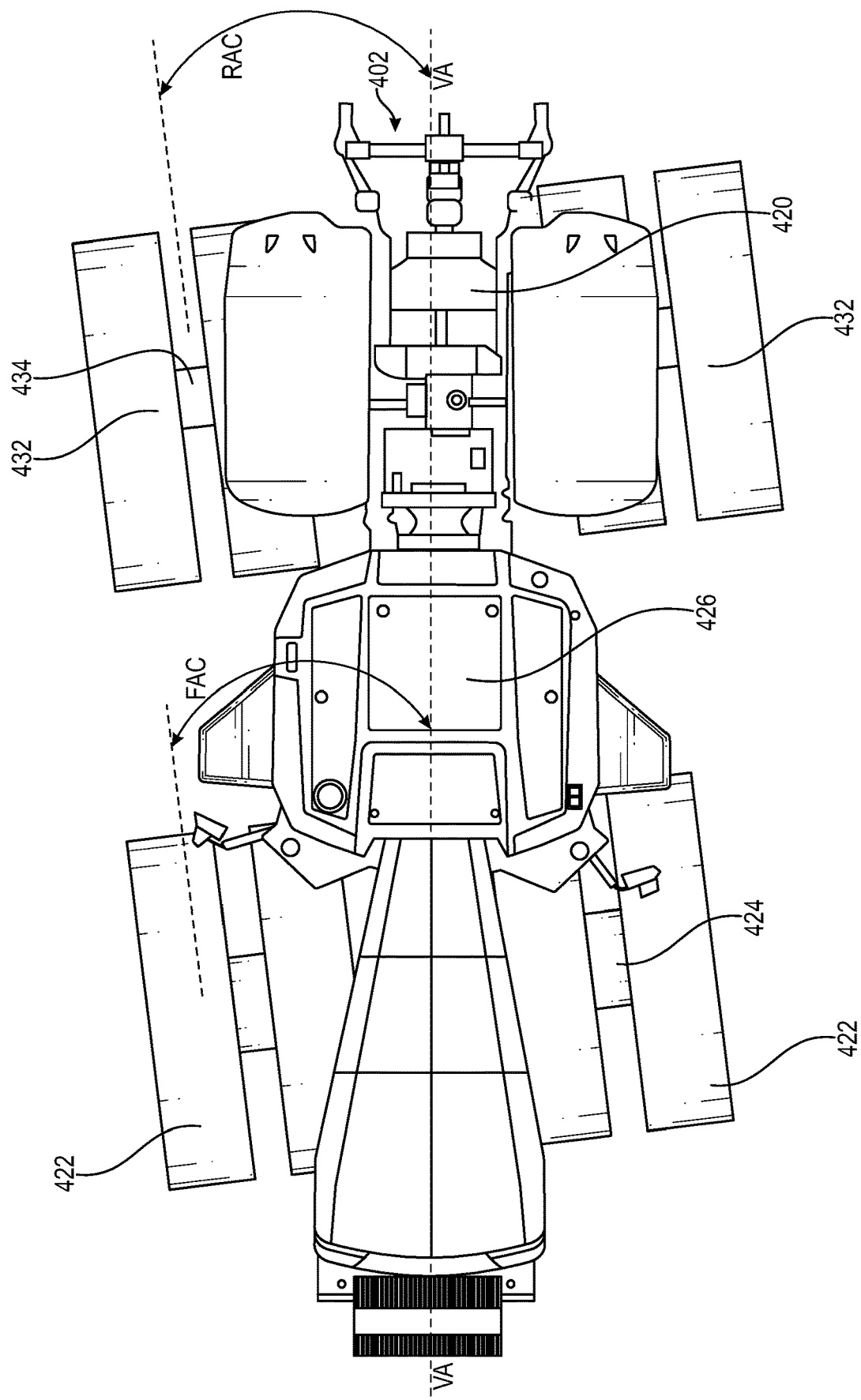
FIG. 4 is a top view of another embodiment of an agricultural vehicle that includes a front axle coupled to front wheels and a rear axle coupled to rear wheels on a fixed frame.

In some embodiments, the illustrative tractor 102 may be embodied as, or otherwise include, any one of a number of tractors manufactured by John Deere. For example, the tractor 102 may be embodied as, or otherwise include, any one of the following: a series 9570R Tractor, a series 9620R Tractor, a series 9470RT Tractor, a series 9520RT Tractor, a series 9570RT Tractor, a series 9420RX Tractor, a series 9470RX Tractor, a series 9520RX Tractor, a series 9570RX Tractor, or a series 9620RX Tractor. Of course, in other embodiments, it should be appreciated that the tractor 102 may be embodied as, or otherwise include, any other suitable tractor or agricultural vehicle such as illustrated in FIGS. 3 and 4. For example, in FIG. 3 a tractor 302 is illustrated that is an articulated type of tractor with a tractor frame that pivots in the center, allowing a rear portion of the tractor frame to follow the same path as a front portion of the tractor frame. In FIG. 4, a tractor 402 is illustrated as having a straight frame that does not articulate or pivot. The embodiments illustrated in FIGS. 3 and 4 include all of the features from FIG. 1 unless described otherwise.

It should be appreciated that the tractor 102 may be embodied as, or otherwise include, equipment used in one or more of a variety of applications. In the illustrative embodiment, the tractor 102 is adapted for use in one or more agricultural applications as indicated above. In other embodiments, however, the tractor 102 may be embodied as, included in, or otherwise adapted for use with, equipment used in lawn and garden, construction, landscaping and ground care, golf and sports turf, forestry, engine and drivetrain, or government and military applications, for example. In such embodiments, the vehicle 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative tractor 102 includes a frame structure 110, a front section 120, and a rear articulation section 130. The frame structure 110 may include, or otherwise be embodied as, a main frame or main chassis of the tractor 102. The front section 120 is coupled to the frame structure 110 and includes front wheels 122 that are supported for movement on a front axle 124. The front section 120 includes an operator cab 126 in which various operational controls for the tractor 102 are provided, as described in greater detail below. The rear articulation section 130 is coupled to the frame structure 110 and to rear wheels 132 that are supported for movement on a rear axle 134. The rear articulation section 130 is pivotally coupled to the front section 120 via an articulation joint 136 and arranged opposite the front section 120 along a vehicle axis VA. The articulation joint 136 is located at a zero (0) degree inclination, such that the tractor 102 moving in either a forward direction or a rearward direction, moves along a straight line path upon a relatively flat, even, and level surface. Because the rear articulation section 130 is configured for pivotal movement relative to the front section 120 as will be apparent from the discussion that follows, the vehicle 100 may be referred to as an articulated vehicle 100. Moreover, the vehicle 100 or tractor 102 is configured for crab steering control or the like as described below. As can be appreciated, crab steering control of the tractor 102 results in a lateral offset LO of the front wheels 122 from the rear wheels 132 as described below.

Illustrated in FIG. 3 is tractor 302 that includes a front section 320 and a rear articulation section 330. The front section 320 includes front wheels 322 that are supported for movement on a front axle 324. The front section 320 includes an operator cab 326 in which various operational controls for the tractor 302 are provided, as described in greater detail below with reference to tractor 102. The rear articulation section 330 includes rear wheels 332 that are supported for movement on a rear axle 334. The rear articulation section 330 is pivotally coupled to the front section 320 via an articulation joint 336 and arranged opposite the front section 320 along a vehicle axis VA. The articulation joint 336 is located at a zero (0) degree inclination, such that the tractor 302 moving in either a forward direction or a rearward direction, moves along a straight line path upon a relatively flat, even, and level surface. Because the rear articulation section 330 is configured for pivotal movement relative to the front section 320, the vehicle 300 may be referred to as an articulated vehicle 300. Moreover, the front axle 324 can turn in a first direction while the rear articulation section 330 pivots about the articulation joint 336 in an opposite direction. The tractor 302 is configured for crab steering control or the like as described below. As can be appreciated, crab steering control of the tractor 302 results in the front axle 324 and the front wheels 322 turning in a first direction or a front axle steering angle FAC. The crab steering control of the tractor 302 results in the rear articulation section 330 pivoting in the same direction as the front axle 324 at a rear axle steering angle ASA such that the rear wheels 332 also pivot. The front axle steering angle FAC may be the same or different that the rear axle steering angle ASA as described below.

Illustrated in FIG. 4 is tractor 402 that includes a frame section 420 that is fixed in a straight configuration. The frame section 420 includes front wheels 422 that are supported for movement on a front axle 424. The frame section 420 includes an operator cab 426 in which various operational controls for the tractor 402 are provided, as described in greater detail below with reference to tractor 102. The frame section 420 includes rear wheels 432 that are supported for movement on a rear axle 434. The frame section 420 includes a vehicle axis VA that is located at a zero (0) degree inclination, such that the tractor 402 moving in either a forward direction or a rearward direction, moves along a straight line path upon a relatively flat, even, and level surface. The steering of the tractor 402 is accomplished via the front wheels 422 supported on the front axle 424 and the rear wheels 432 supported on the rear axle 434 with electronic control over both steering systems, i.e., the front axle 424 and the rear axle 434 turned in same direction. The tractor 402 is configured for crab steering control or the like as described below. As can be appreciated, crab steering control of the tractor 402 results in the front wheels 422 turning in a first direction or a front axle steering angle FAC. The crab steering control of the tractor 402 results in the rear wheels 432 rotating in the same direction as the front wheels 422 at a rear axle steering angle RAC. The front axle steering angle FAC may be the same or different that the rear axle steering angle RCA as described below.

Other forms of vehicles include a front axle steering system and an articulation joint without a rear axle steering system. In this form, a rear axle is fixed to the frame. The automatic crab steering control of this type of vehicle includes the front axle steering system and the front wheels turning in a first direction or a front axle steering angle FAC. The crab steering control of the tractor results in the articulation joint pivoting in the same direction as the front axle steering system at a rear axle steering angle ASA however the rear wheels would not pivot.

In the illustrative embodiment, the front section 120 includes a drive unit or engine 128 that is configured to supply driving power to one or more driven components of the tractor 102. The drive unit 128 is embodied as, or otherwise includes, any device capable of supplying rotational power to driven components of the tractor 102 to drive those components. In some embodiments, rotational power supplied by the drive unit 128 may be provided to the driven components of the tractor 102 by one or more transmission(s). In one example, the drive unit 128 may be configured to supply power to one or more transmission(s) that is/are coupled to the front wheels 122 and/or the rear wheels 132 and operable to provide various predetermined speed ratios selectable by an operator in reverse and forward operating modes. Additionally, in some embodiments, the drive unit 128 may be coupled to a pump or generator to provide hydraulic, pneumatic, or electrical power to one or more components of the tractor 102, as the case may be.

The illustrative tractor 102 includes a front axle steering system 140 associated with the front section 120 and a rear articulation section steering system 150 associated with the rear articulation section 130. The front axle steering system 140 is embodied as, or otherwise includes, a collection of devices that are cooperatively configured to adjust the position and/or angular orientation of the front wheels 122 and the front axle 124 and thereby steer those components during operation of the tractor 102 in response to operating the tractor 102 in an automated or electronic steering control mode, which may be provided via a front section steering wheel (not shown) located in the operator cab 126, for example. Alternatively, the front axle steering system 140 is operable in response to a steering input provided by an operator. Similarly, the rear articulation section steering system 150 is embodied as, or otherwise includes, a collection of devices that are cooperatively configured to adjust the position and/or angular orientation of the rear wheels 132 and the rear axle 134 and thereby steer those components during operation of the tractor 102 in response to operating the tractor 102 in an automated or electronic steering control mode, which may be provided via a rear articulation section steering wheel (not shown) located in the operator cab 126. Alternatively, the rear articulation section steering system 150 is operable in response to a steering input provided by an operator. It should be appreciated that each of the steering systems 140, 150 may include, or otherwise be embodied as, one or more linkages, racks, pinions, bars, brackets, rods, gears, pulleys, sprockets, wheels, bearings, shafts, chains, belts, axles, actuators, valves, tracks, differentials, or the like which are cooperatively configured to steer the wheels 122, 132 and the corresponding axles 124, 134 based on the automated steering control mode.

Figure 2:
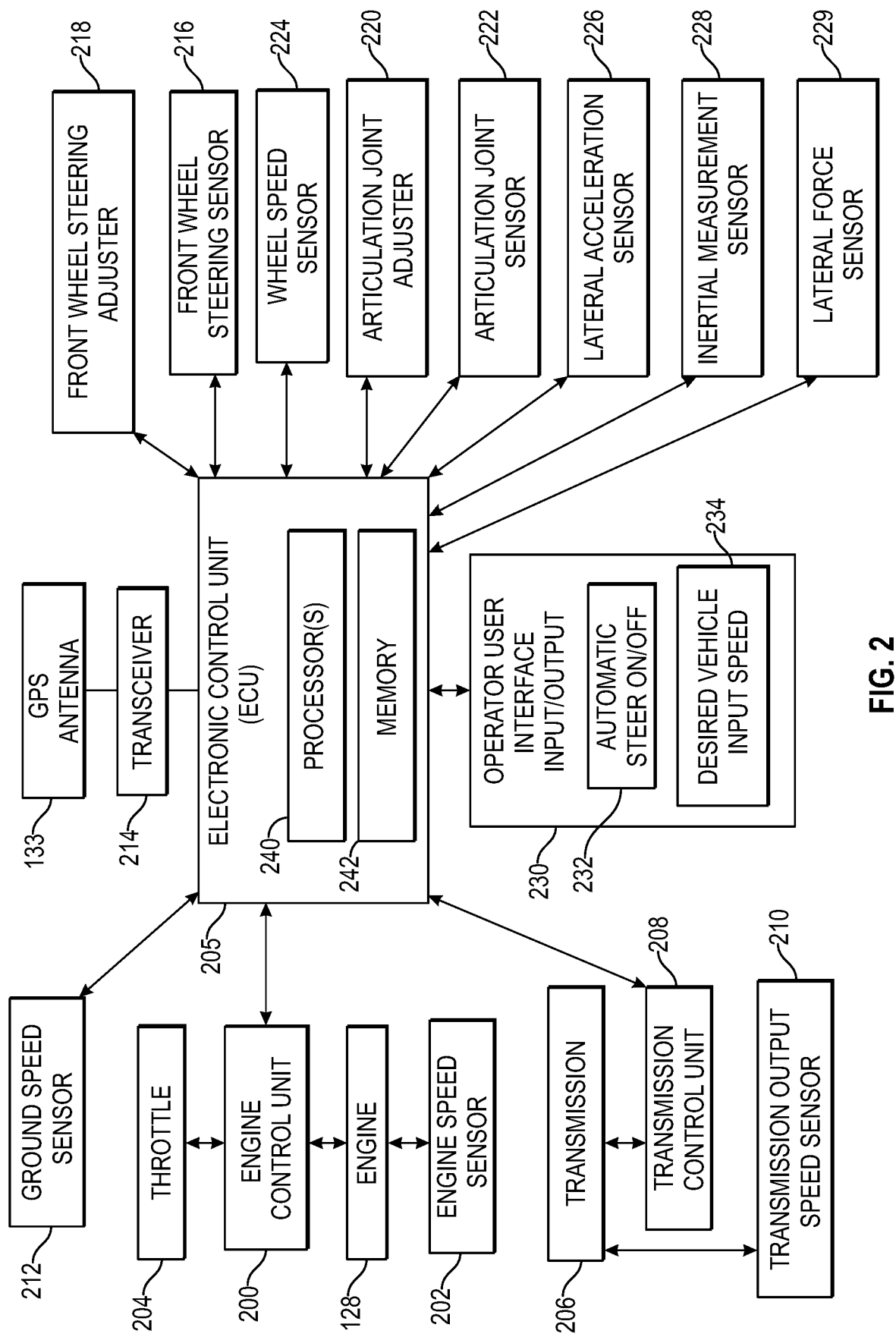
FIG. 2 is a control system block diagram for the vehicle shown in FIG. 1.

As further illustrated in FIG. 2, the tractor 102 includes the engine 128 which is operatively connected to an engine control unit 200, which in one embodiment is operatively connected to an engine speed sensor 202 configured to determine the speed of the engine 128. A throttle 204 is operatively connected to the engine control unit 200 to adjust the speed of the engine, and therefore the vehicle speed as would be understood by one skilled in the art. In another embodiment, the throttle 204 is additionally a machine controlled throttle which is automatically controlled by an electronic control unit (ECU) 205, also known as a controller, in response to vehicle speed information. The engine control unit 200 is operatively connected to the ECU 205, which is located in the cab 126 or at other locations within the tractor 102. The ECU 205 is configured to receive and to process vehicle information received from the engine control unit 200.

A transmission 206 is operatively connected to the front wheels 122 and to the rear wheels 132 to move the vehicle in a forward or a reverse direction. A transmission control unit 208 is operatively connected to the ECU 205. A transmission output speed sensor 210 is operatively connected to the transmission 206 and is configured to determine the output speed of the transmission 206. The output speed of the transmission 206 determines the rotational speed of the wheels, and therefore the speed of the tractor 102.

In addition to the engine speed sensor 202 and the transmission output speed sensor 210, other vehicle environment sensors are operatively connected to the ECU 205 to monitor the operating conditions of the vehicle. A ground speed sensor 212 is operatively connected to the ECU 205 to provide the ground speed of the tractor 102 as it moves in the forward or in a reverse direction. In one embodiment, the ground speed sensor 212 is a radar unit connected to the vehicle and is configured to provide a radar signal to the ECU 205 for determining speed. In another form, a ground speed signal is provided by a communication antenna or GPS antenna 133 through a receiver or transceiver 214 configured to communicate with the global positioning system as is understood by those skilled in the art. The GPS antenna 133 is configured to receive and to send global positioning data to and from a GPS satellite as is known by those skilled in the art. Steering commands, when included in the GPS transmission, direct the vehicle or tractor 102 along the field being worked.

Additional vehicle environment sensors are used by the vehicle or tractor 102 to control the forward and the rearward movement of the vehicle either in a straight line path or in a curved line path, such as when the vehicle is turning at the end of rows in a field. A front wheel steering sensor 216 is operatively connected to the ECU 205 and is configured to transmit a front axle steering angle of the front wheels. The front wheel steering sensor 216, in one embodiment, is located at a steering gearbox of a front wheel steering assembly 140. Other locations of the front wheel steering sensor 216 are contemplated including at a front wheel steering adjuster 218 configured to move the front wheels 122 in the desired direction. In one embodiment, the front wheel steering adjuster 218 is a steering wheel. In another embodiment, the front wheel steering adjuster 218 is included as a feature of the ECU 205 which automatically adjusts the direction of the front wheels 122 as describe herein. In one embodiment, the front wheel steering adjuster 218 commands the direction of the front wheels in response to signals received from the global positioning system.

The vehicle or tractor 102 further includes an articulation joint adjuster 220, or articulator, which is configured to adjust the position of the rear articulation section 130 with respect to the front section 120 in response to one or more of the steering wheel, the front wheel adjuster 218, and signals received from the electronic control unit 205 generated in response to directional signals. The articulation joint adjuster 220 is configured to laterally offset the front tires 122 from the rear tires 132 by adjusting the position of the rear articulation section 130 with respect to the front section 120 by the lateral offset amount LO as described below when the tractor 102 is under crab steering control. An articulation joint sensor 222 is located at one or more locations on the vehicle or tractor 102. In one embodiment, the articulation joint sensor 222 is located at the articulation joint 136 and is configured to determine an amount of pivot or an articulation steering angle at the articulation joint 136. In one embodiment, the articulation joint sensor 222 determines a mechanical position between a fixed part of one of the frames and a corresponding movable part that pivots about the fixed part. In another embodiment, the articulation joint sensor 222 is configured as a portion of the ECU 205 and determines the position of the rear articulation section 130 with respect to the front section 120 based on the signal being transmitted to the articulation joint adjuster 220. In one embodiment, the articulator 220 includes a first and a second hydraulic cylinder each of which is coupled the front section 120 and the rear articulation section 130 at the articulation joint 136. Actuation control of each of the first and second cylinders by the controller 205 adjusts the position of the rear articulation section 130 with respect to the front section 120. Other types of articulators 220 are contemplated.

Additional vehicle environment sensors include, but are not limited to, a wheel speed sensor 224, a lateral acceleration sensor 226, an inertial measurement sensor 228, and a lateral force sensor 229. The wheel speed sensor 224, in different embodiments, is located at one or more of the wheels 122 and 132 and determines a speed of the wheel with respect to a fixed part of the vehicle or tractor 102, such as the supporting axle. The wheel speed sensor 224 is configured to transmit a wheel speed signal to the ECU 205 that includes rotational speed information of the wheel when the wheels are providing traction or when the wheels are slipping or spinning. The ECU 205 is configured to determine when the wheels are losing traction, slipping, or spinning, by comparing the wheel speed to the ground speed signal generated by the ground speed sensor 212. The ECU 205 is configured to determine a desired vehicle speed of the one or more of the wheels 122 and 132, as described in more detail below.

The lateral acceleration sensor 222 is operatively connected to the vehicle in one or more locations either at the front section 120 or the rear articulation section 130. The lateral acceleration sensor 222, in one or more embodiments, includes a lateral accelerometer device or a sensor that measures a yaw rate. In one embodiment the wheel speed sensor 222 includes two or more lateral acceleration sensors, where at least one of the sensors 222 is located at the front section 120 and another one of the sensors is located at the rear articulation section 130. The inertial measurement sensor 228 determines an actual lateral acceleration of the vehicle or tractor 102, either alone or in combination with the lateral acceleration sensor 222. In different embodiments, the inertial measurement sensor 228 includes, an accelerometer, a gyroscope, a magnetometer, or a combination thereof.

The vehicle or tractor 102 further includes the operator user interface 230 that is operatively connected to the ECU 205. The user interface 230 includes various user input and/or outputs for determining and/or displaying vehicle status. The user interface 230 further includes one or more control mode inputs configured to control steering of the articulated vehicle for predetermined steering conditions. An automatic steering on and off control device 232 is configured to enable a user to set the vehicle in an automatic or automated steering mode or in a manual steering mode in which the operator controls steering of the vehicle. When the automatic steering is turned on, a desired path curvature of the tractor 102 is determined by the ECU 205 based on information stored in the memory 242, or based on information received through the GPS antenna 133, or the front wheel sensor 216 and the articulation joint sensor 222. In another embodiment, the user interface 230 includes a desired vehicle speed input 234 which enables the user to select a desired vehicle speed of the tractor 102 and determine a desired steering angle. The desired vehicle speed input 234 is converted to a desired steering angle which is then utilized to determine the articulation steering angle or the rear axle steering angle and the front axle steering angle as described in more detail below.

The ECU 205, in different embodiments, includes a computer, computer system, or other programmable devices. In other embodiments, the ECU 205 can include one or more processors 240 (e.g. microprocessors), and an associated memory 242, which can be internal to the processor or external to the processor 240. The memory 242 can include random access memory (RAM) devices comprising the memory storage of the ECU 205, as well as any other types of memory, e.g., cache memories, non-volatile or backup memories, programmable memories, flash memories, and read-only memories. In addition, the memory in different embodiments includes a memory storage physically located elsewhere from the processing devices, including any cache memory in a processing device, as well as any storage capacity used as a virtual memory, e.g., as stored on a mass storage device or another computer coupled to ECU 205. The mass storage device can include a cache or other dataspace which can include databases. Memory storage, in other embodiments, is located in the "cloud", where the memory is located at a distant location which provides the stored information wirelessly to the ECU 205. When referring to the ECU 205 and the memory 242 in this disclosure other types of controllers and other types of memory are contemplated.

The ECU 205 executes or otherwise relies upon computer software applications, components, programs, objects, modules, or data structures, etc. Software routines resident in the included memory of the ECU 205, or other memory, are executed in response to the signals received from the sensors as well as signals received from the engine control unit 205, the transmission control unit 208, the ground speed sensor 212, wheel speed sensor 224, lateral acceleration sensor 226, inertial measurement sensor 228, lateral force sensor 229, and the GPS antenna 133. The ECU 205 also relies on computer software applications to adjust the front wheel steering operation as well as adjust the articulation joint steering operation and/or the rear axle steering operation. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided a user interface operated by the user.

The operator of the articulated vehicle or tractor 102 is provided with steering control modes available at the user interface 130 while farming, during transport, and at various speeds. The angle of the steerable front wheels 122 and the angle of the rear articulation section 130 with respect to the front section 120 are both adjustable. The front axle steering angle of the front wheels 122 is adjustable without adjustment of the articulation steering angle or the front axle steering angle is adjustable in combination with adjustment of the articulation steering angle.

In one embodiment of the automatic mode, during field operation of the tractor 102 in a forward direction "F" as illustrated in FIG. 1, the articulation section steering system 150 is commanded to operate at an articulation steering angle and the front axle steering system 140 is commanded to operate at the front axle steering angle based on the vehicle speed input 234. This enables the tractor 102 to hold a more accurate line of travel path which compensates for lateral forces acting on the vehicle and/or wheel slippage. In FIG. 1, the tractor 102 is depicted in a laterally offset configuration in which the wheels 122 are laterally offset LO from the wheels 132 relative to the vehicle axis VA. It should be appreciated that other orientations of the wheels 122, 132 are described below with reference to the vehicle axis VA and different machine forms such as illustrated in FIGS. 3 and 4.

The vehicle or tractor 102 is operated in an electronic steering mode of operation at a desired vehicle speed wherein the lateral force sensor 229 or another of the vehicle environment sensors detects the presence of a lateral force on the vehicle or tractor 102.

In response to detection of the lateral force on the vehicle or tractor 102 and based on the desired vehicle speed, the ECU 205 determines an actual lateral acceleration of the tractor 102 and a predicted lateral acceleration of the tractor 102. The actual lateral acceleration is determined using the lateral acceleration sensor 222 and/or the inertial measurement sensor 228 that measures yaw rate and the vehicle speed is determined from the ground speed sensor 212 from the following formula.

Actual Lateral Acceleration $(m/s^2)$=Yaw Rate (radians/s)*Vehicle Speed (m/s)

A predicted lateral acceleration of the vehicle 102 is calculated from the vehicle's ground speed as determined from the ground speed sensor 212 and a steering angle in radians as determined by the front wheel steering sensor 216 as described below.

Predicted Lateral Acceleration $(m/s^2)$=Ground Speed $(m/s)^2$×Steering Angle (radians)/Wheel Base (m)

If one or more of the vehicle sensors detect a lateral force acting on the tractor 102, then based on the vehicle speed, the actual lateral acceleration of the tractor 102 and the predicted lateral acceleration of the tractor 102 are determined. Alternatively to the vehicle sensors detecting a lateral force acting on the tractor 102, a wheel slip which is calculated from the difference between the wheel speed and ground speed is an indication of how effective lateral forces are in making the vehicle or tractor 102 slide downhill or move laterally. Generally, crab steering of the tractor 102 is more effective in higher wheel slip conditions.

Next the ECU 205 determines a lateral acceleration error by comparing the predicted lateral acceleration to the actual lateral acceleration. Then the ECU 205 determines if the lateral acceleration error exceeds a lateral acceleration limit, and compensates for the lateral force acting on the vehicle 100 or tractor 102 by turning both of the front axle steering system 140 and the rear axle steering system 150 to a crab steering correction angle which can be converted to the lateral offset LO of the front axle steering system 140 from the rear axle steering system 150 in FIG. 1. The crab steering correction angle includes a front axle steering angle and a rear axle steering angle, wherein the front axle steering system 140 is configured to adjust to the front axle steering angle and the rear axle steering system 150 is configured to adjust to the rear axle steering angle. The crab steering correction angle includes the front axle steering angle that is illustrated as FAC and the rear axle steering angle that is illustrated as ASA in FIG. 3. Alternatively the crab steering correction angle includes the front axle steering angle that is illustrated as FAC and the rear axle steering angle that is illustrated as RAC in FIG. 4. In any of FIGS. 1, 3, and 4, the front axle steering system 140 is configured to adjust to the front axle steering angle and the rear axle steering system 150 is configured to adjust to the rear axle steering angle. In any embodiment, the front axle steering angle can be a different amount than the rear axle steering angle such as greater or lesser than.

The crab steering correction angle can be adjusted by an operator correction factor so the operator can vary the aggressiveness or amount of the crab steering correction angle. The operator correction factor can be input by the operator or inherent in ECU 205, so an operator can vary the aggressiveness of the adjustment to the crab steering correction angle. In one embodiment, the crab steering correction angle is between 0 and 15 degrees as measured relative to a longitudinal axis VA of each of the front axle steering system 140 and the rear axle steering system 150.

The predicted lateral acceleration can be enhanced by adding a vehicle roll angle and wheel or tire slip as inputs. The inertial measurement sensor 228 detects a vehicle roll angle. The vehicle roll angle can be accounted for in the predicted lateral acceleration as steeper roll angles will cause the vehicle or tractor 102 to slide more downhill. Wheel slip, which is calculated from the difference of wheel speed as provided by the wheel speed sensor 224 and ground speed as provided by the ground speed sensor 212, is an indication of how effective lateral forces are playing in making the vehicle or tractor 102 slide downhill, and crab steering is more effective in higher wheel slip conditions. If there is no wheel slipping or no vehicle rolling, then there is no need to determine a crab steering correction angle.

The present application is directed to for providing automatic side hill compensation for the vehicle 100 capable of electronic crab steering control or the like upon detection that the vehicle is sliding laterally or lateral forces are acting on the vehicle 100 to thereby minimize lateral tracking error of the GPS. The applications not limited to side hills; any lateral forces acting on the vehicle 100 can be automatically compensated by this control system.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system comprising:
a vehicle including a front axle steering system, a rear axle steering system, one or more vehicle environment sensors, and a controller operatively coupled with the front axle steering system, the rear axle steering system, and the one or more vehicle environment sensors, wherein the controller is configured to:
operate the vehicle in an electronic steering mode of operation at a desired vehicle speed;
detect presence of a lateral force on the vehicle in response to input from the one or more vehicle environment sensors;
in response to detection of the lateral force on the vehicle and in response to the desired vehicle speed, determine an actual lateral acceleration of the vehicle and a predicted lateral acceleration of the vehicle;
determine a lateral acceleration error by comparing the predicted lateral acceleration to the actual lateral acceleration; and
in response to the determination of the lateral acceleration error, determine if the lateral acceleration error exceeds a lateral acceleration limit, then compensate for the lateral force acting on the vehicle by turning both of the front axle steering system and the rear axle steering system to a crab steering correction angle.

2. The system of claim 1, wherein the crab steering correction angle is adjusted by an operator correction factor.

3. The system of claim 1, wherein the crab steering correction angle includes a front axle steering angle and a rear axle steering angle, the front axle steering system configured to adjust to the front axle steering angle and the rear axle steering system configured to adjust to the rear axle steering angle.

4. The system of claim 3, wherein the front axle steering angle is different from the rear axle steering angle.

5. The system of claim 1, wherein the vehicle includes an articulated steering system between the rear and the front axle steering systems configured to laterally offset the rear axle steering system from the front axle steering system.

6. The system of claim 1, wherein the one or more sensors measure a yaw rate and an actual vehicle speed.

7. The system of claim 1, wherein the one or more sensors include a lateral accelerometer.

8. The system of claim 1, wherein the one or more sensors measure a vehicle roll angle; and
adjusting the crab steering correction angle based on the vehicle roll angle.

9. The system of claim 1, wherein the front axle steering system includes at least two wheels, the rear axle steering system includes at least two wheels,
wherein the one or more sensors measures a wheel slip condition of each of the wheels of the front axle steering system and the rear axle steering system; and
adjusting the crab steering correction angle based on the wheel slip condition being satisfied for any of the wheels.

10. The system of claim 1, wherein the crab steering correction angle is between 0 and 15 degrees as measured relative to a longitudinal axis of each of the front axle steering system and the rear axle steering system.

11. A method of steering a vehicle, comprising:
operating the vehicle in an electronic steering mode of operation wherein the vehicle includes a front axle steering system, a rear axle steering system, one or more vehicle environment sensors, and a controller operatively coupled with the front axle steering system, the rear axle steering system, and the one or more vehicle environment sensors;
commanding the vehicle to operate at a desired vehicle speed;
detecting a lateral force acting on the vehicle in response to input from the one or more vehicle environment sensors;
in response to detecting the lateral force and the desired vehicle speed, determining an actual lateral acceleration of the vehicle and a predicted lateral acceleration of the vehicle from the desired vehicle speed;
determining a lateral acceleration error by comparing the predicted lateral acceleration to the actual lateral acceleration; and
in response to the determination of the lateral acceleration error, determining if the lateral acceleration error exceeds a lateral acceleration limit, then turning both of the front axle steering system and the rear axle steering system to a crab steering correction angle.

12. The method of claim 11, wherein the crab steering correction angle is adjusted by an operator correction factor.

13. The method of claim 11, wherein the crab steering correction angle includes a front axle steering angle and a rear axle steering angle;
adjusting the front axle steering system to the front axle steering angle; and
adjusting the rear axle steering system to the rear axle steering angle.

14. The method of claim 13, wherein the front axle steering angle is different from the rear axle steering angle.

15. The method of claim 11, wherein the vehicle includes an articulated joint between the rear and the front axle steering systems; and
offsetting laterally the rear axle steering system from the front axle steering system.

16. The method of claim 11, further comprising:
measuring a yaw rate and an actual vehicle speed with the one or more sensors; and
determining the actual lateral acceleration with the yaw rate and actual vehicle speed.

17. The method of claim 11, wherein the one or more sensors include a lateral accelerometer for measuring the actual lateral acceleration.

18. The method of claim 11, wherein the one or more sensors measure a vehicle roll angle; and
   adjusting the crab steering correction angle based on the vehicle roll angle.

19. The method of claim 11, wherein the front axle steering system includes at least two wheels, the rear axle steering system includes at least two wheels,
   measuring a wheel slip condition of each of the wheels of the front axle steering system and the rear axle steering system with one or more sensors; and
   adjusting the crab steering correction angle based on the wheel slip condition being satisfied for any of the wheels.

20. The method of claim 11, wherein the crab steering correction angle is between 0 and 15 degrees as measured relative to a longitudinal axis of each of the front axle steering system and the rear axle steering system.

* * * * *